March 31, 1970 S. B. CARTER 3,503,665
CELL CULTURE SLIDES

Filed Jan. 3, 1966 2 Sheets-Sheet 1

INVENTOR
STEPHEN BARNABY CARTER

By Cushman, Darby & Cushman
ATTORNEYS

March 31, 1970  S. B. CARTER  3,503,665
CELL CULTURE SLIDES
Filed Jan. 3, 1966  2 Sheets-Sheet 2

INVENTOR
STEPHEN BARNABY CARTER

By Cushman, Darby & Cushman
ATTORNEYS 3,503,665
CELL CULTURE SLIDES
Stephen Barnaby Carter, Macclesfield, England, assignor to Imperial Chemical Industries Limited, London, England, a corporation of Great Britain
Filed Jan. 3, 1966, Ser. No. 518,345
Claims priority, application Great Britain, Jan. 5, 1965, 430/65
Int. Cl. G02b 21/34
U.S. Cl. 350—95
2 Claims

ABSTRACT OF THE DISCLOSURE

A cell culture slide, for microscope use, comprising a glass plate and a cover glass spaced apart by a boundary member secured to or integral with the glass plate and providing an abutment surface against which the cover glass may sealingly abut, the plate, cover glass and boundary member together defining a space for containing a cell culture medium, a closable inlet passage being provided through the boundary member.

---

This invention concerns cell culture slides, that is to say microscope slides employed for microscopic examination of cell cultures.

Various constructions of cell culture slides, which must provide for the retention of a liquid cell culture medium in contact with the culture, are already known.

Generally, however, these are of a construction involving two metal plates with central apertures or the like adapted to be secured together (e.g., by screws) so as to retain between them a sandwich composed of a pair of thin glass elements or plates with a ring-like gasket therebetween, the space between the glass plates and within the gasket serving to accommodate the liquid culture medium which can be introduced by pushing a fine needle through the gasket after the manner of a hypodermic syringe. It is well known that it is usually desirable to leave a bubble of air in the liquid culture medium, so that the introduction of such medium is usually effected so as to leave a small volume of the culture medium space still occupied by air.

These prior known slides suffer from a number of practical disadvantages. Firstly, when the cell culture fluid is injected into its space the air previously in such space must be expelled through a vent needle separately introduced through the gasket.

Secondly, the apertured metal plates provide a thickness of material on each side of the glass plates with their apertures providing for visual access to the glass plates, so that the plates are effectively each visible at the bottom of a cavity, which may be shallow or deep according to the thickness of the metal plates. When the slide is loaded into a microscope, it is usually necessary to raise the lens system thereof so that the slide clears the objective end thereof and examination cannot be effected until the microscope has been readjusted, the objective end thereof then usually having to project into the cavity or aperture in the uppermost metal plate of the slide. This readjustment is usually necessary each time the slide is loaded or unloaded, and each time the objective lens of the microscope is changed.

Further, because part of the microscope projects into the cavity as just described, it will be evident that the area of the slide which can be examined visually is restricted by the size of the cavity and the dimensions of the microscope part projecting therein. Consequently, examination of the whole of a cell culture on the underside of the uppermost of the two glass plates is not possible.

Moreover, if, as previously discussed, a bubble of air is left in the liquid culture medium, the cell culture on the underside of the uppermost glass plate will not necessarily be in contact with the liquid medium and may be adversely affected by the fact that is it effectively in contact with the air.

Another difficulty arises from the fact that it is possible to damage or break the glass plates when the needle is inserted for introduction of the culture medium and in addition it is usually not possible to remove the cover glass intact for further study of the cell culture for example by staining, by reason of its firm adherence to the gasket.

Yet another disadvantage of the prior known arrangements is that the dismantling, cleaning, sterilising and reassembling thereof is tedious and time consuming, and the use of a rubber gasket, of course, has the disadvantage that it is somewhat more difficult to sterilise than glass or metal.

An object of this invention is to provide a construction of slide suitable for use in cell culture examination, which is simple and convenient to assemble and dismantle, which allows the glass plate bearing the culture to be removed or transferred without breakage or risk of introducing contamination, which does not provide obstructions necessitating microscope readjustment upon loading or unloading of the slide, and which can be constructed in an embodiment wherein all the aforementioned difficulties or disadvantages are obviated.

With this object in view, the present invention provides a cell culture slide, for microscope use, comprising a glass plate and a cover glass spaced apart by a boundary member secured to or integral with the glass plate and providing an abutment surface against which the cover glass may sealingly abut, the plate, cover glass and boundary member together defining a space for containing a cell culture medium, a closable inlet passage being provided through the boundary member.

Conveniently, the boundary member is in the form of a ring of a plastics material, or of glass or of metal (e.g., stainless steel) appropriately cemented (e.g., using an epoxy resin) to the glass plate, and in such case the inlet passage may be provided by a tube projecting radially from the boundary member.

In certain circumstances, as will hereinafter become evident, it is not essential to provide any specific mechanical arrangement for holding the cover glass in position. Conveniently, however, clip means are provided for so locating the glass, and such may comprise a pair of clips adapted to engage with anchoring points on the glass plate or on the boundary member, and to press on the cover glass at the side thereof remote from the boundary member, to hold the glass against displacement away from the boundary member.

In a preferred embodiment of the slide of the invention, a second or inner boundary member, also having a respective abutment surface against which the cover glass abuts, is provided with the first mentioned boundary member, such second boundary member having a gap therein in alignment with the inlet to permit introduction of cell culture medium through the inlet.

Preferably the gap as aforesaid is such that with the space defined by the second or inner boundary member filled with a liquid cell culture medium, and air in the space between the two boundary members, surface tension in the culture medium will effectively prevent unintentional flow of the medium through the gap.

The invention will be described further, by way of example, with reference to the accompanying drawings, in which.

Throughout the drawings, similar reference numerals have been allocated to similar parts.

Figure 1:
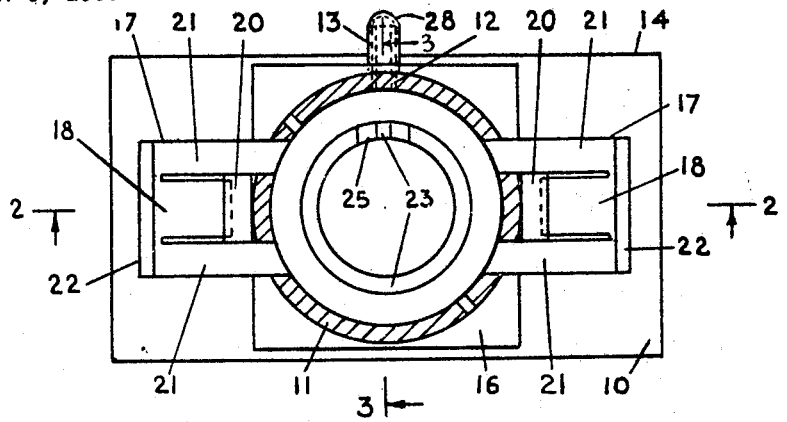
FIG. 1 is a plan view of a preferred practical embodiment of the slide according to the invention.

Referring firstly to FIGS. 1 to 6, the slide here illustrated comprises a substantially rectangular thin glass plate 10 to which is secured a main or outer boundary member in the form of a ring 11 of stainless steel, this being cemented in position by use of a suitable material such as an epoxy resin. The ring 11 could, if desired, be of glass or of a plastics material, instead of metal.

An inlet passage 12 leads through the ring 11 and a radially projecting tube 13 connects therewith at a point on the ring 11 which lies closely adjacent one longitudinal edge 14 of the plate 10.

That edge or surface 15 of the ring 11 which is directed away from the glass plate 10 is ground flat and substantially parallel to the glass plate 10, and constitutes an abutment surface for a cover glass 16 which is somewhat thinner than the glass plate 10. This cover glass 16 is held in position against the ring 11 by a pair of E-shaped springs 17 the central bar or limb 18 of each of which engages into a respective slot 19 in a respective anchoring post 20 and the outer bars or limbs 21 of which overlie, by their ends, the cover glass 16. The posts 20 are narrow enough to project upwards between the outer bars or limbs 21 of the respective springs 17 and the "upright" part 22 of the E of each spring 17 is bent as shown to provide a portion of the spring which will rest on the glass plate 10 and retain the outer limbs 21 approximately at the same level as the cover glass 16, such outer limbs 21 tending to be deformed by curving towards the plate 10, as shown, by the engagement of the central limbs 18 with their posts 20.

The posts 20 are substantially diametrically opposite to one another relative to the ring 11 and are secured to the glass plate 10 just outside such ring 11 approximately on the longitudinal centre line of the glass plate 10.

Also secured to the glass plate 10 is a second inner boundary member, this being in the form of a second ring 23 which is of the same material as the ring 11 and is concentrically disposed within such ring 11 and secured to the glass plate 10 in the same manner. This second ring 23 is ground so that its surface 24 remote from the glass plate 10 is substantially coplanar with the abutment surface 15 of the ring 11, so that the cover glass 16 abuts against such surface 24.

A shallow gap 25 is cut away from the ring 23 in alignment with the inlet 12 and a recess 26, the purpose of which will later become evident, is provided in the upper edge 27 of the ring 23 at such gap 25.

A closure cap 28 of a plastics material or other suitable material fits onto the tube 13, and serves as a closure for the inlet 12.

The slide is employed, for example, in the culturing of cells, and subsequent examination thereof, by introducing a suitable cell culture medium containing cells into the space defined by the inner ring 23, the cover glass 16 and the glass plate 10, and subjecting the whole assembly to appropriate environmental conditions to incubate cells in the culture medium. This is done initially with the thin cover glass lowermost, so that the cells fall to the inner surface of the cover glass where they adhere. The culture slide may then be turned over with the cover glass uppermost to allow microscopical examination.

Figure 2:
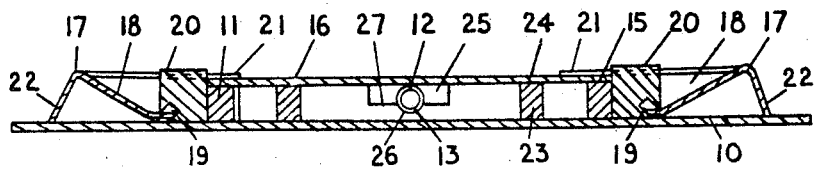
FIG. 2 is an enlarged cross-sectional elevation taken on the line 2—2 of FIG. 1.
Figure 3:
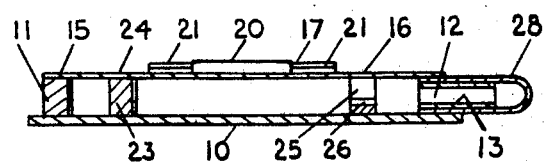
FIG. 3 is an enlarged cross-sectional end view taken on the line 3—3 of FIG. 1.

Assuming the parts of the slide to have been cleaned and sterilised, the parts thereof are assembled as shown in FIGS. 1 to 3. Before the cover glass 16 is put into position, however, a thin coating of viscous oil, e.g., a silicone oil is applied to the surface 15 of the outer ring 11.

Figure 4:
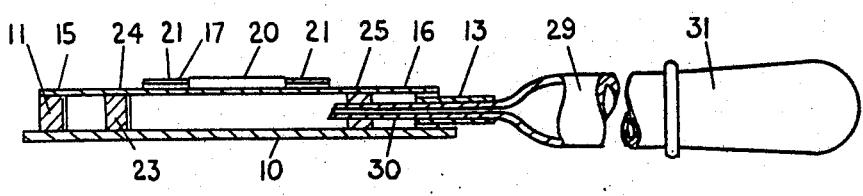
FIG. 4 is a view similar to FIG. 3, but with the stopper removed and showing a filler in position for filling the slide.

FIG. 4 illustrates the step of introducing the liquid cell culture medium into the inner ring 23. With the closure cap 28 removed, the tip 30 of a filler 29 (e.g., of the Pasteur pipette type, including a rubber bulb 31 which can be compressed and released manually to suck up and eject liquid) containing the liquid culture medium (not shown) is inserted through the inlet 12 to project to within the inner ring 23. The bulb 31 is then compressed to cause sufficient of the liquid to flow into the ring 23 to fill the space defined thereby between the cover glass 16 and the plate 10, whereupon the filler is removed by withdrawing it. It will be noted that the recess 26 in the gap 25 in the ring 23 serves to ensure that the ring 23 presents no obstruction whatsoever to the filler tip 30.

It is to be noted also that the depth of the gap 25 in the inner ring 23 is such that the liquid medium will form a stable meniscus across the gap so that there will be no tendency, normally, for the culture medium to run into the annular space between the two rings 11 and 23. The slide, after filling, can accordingly be handled, carried and dealt with satisfactorily provided it is not subjected to knocks or jolts likely to cause rupture of the liquid meniscus across the gap 25. With care, it can be turned upside down for incubation of the cells upon the inner surface of the cover glass 16 as already mentioned.

When the filler tip 30 is withdrawn from the slide, the inlet passage 12 will be open to the atmosphere, and consequently the annular space between the two rings 11 and 23 will contain air at no increased pressure above atmospheric pressure. Further, the liquid culture medium is in contact with and is substantially in gaseous equilibrium with, a reasonably large volume of air as is desirable.

The inlet is closed by use of the closure cap 28 to prevent loss of carbon dioxide gas and water by evaporation but use of the cap 28 is, of course, not necessary to retain the liquid in the slide.

After incubation of cells on the cover glass, the slide can be turned to the position with the cover glass 16 uppermost for microscopic examination, and since there is no obstruction on the outer surface of the cover glass in the region of the area thereof defined by the inner ring 23, the slide can be loaded easily onto a microscope, and the whole of the area on which the cells have been cultured can be examined.

Figure 5:
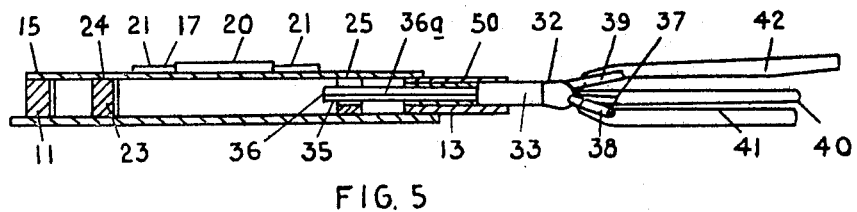
FIG. 5 is a view similar to FIGS. 3 and 4 but showing, in position, a needle whereby test materials can be introduced into and/or perfused through the slide.
Figure 6:
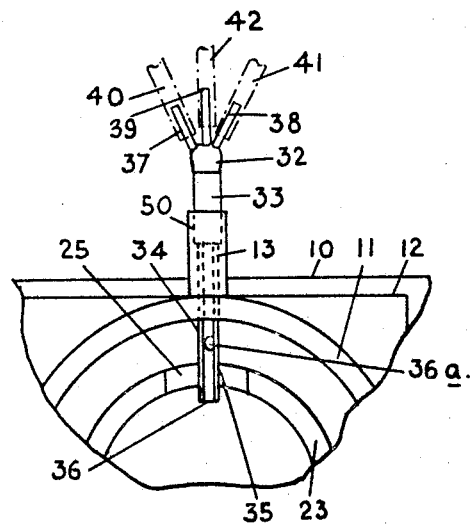
FIG. 6 is a fragmentary plan view corresponding to FIG. 5.

FIGS. 5 and 6 show how the slide can be employed in such a manner that test materials can be introduced, e.g., in the course of research and experiment. To this end, a needle 32, comprising a shank 33 through which extend three hollow tubes 34, 35 and 36, is introduced into the inlet passage 12. The tubes all terminate within the inner ring 23 near to the outer perimeter of the space enclosed by such ring 23. The tubes 34 and 35 are open at their ends projecting within the inner ring 35, whilst the tube 36 is closed off at the corresponding end, being provided with an outlet 36a in its upper surface at a location in the annular space between the rings 11 and 23. The three tubes 34, 35 and 36 have respective connections 37, 38 and 39 wherein they can be connected to appropriate supply or like tubes 40, 41 and 42, and a plastic or rubber sleeve 50 fitting over the projecting tube 13 and the shank 33 serves to retain the needle 32 in position.

By using one of the two tubes 34 and 35 to supply a constant flow of liquid medium, and the other of such needles for permitting liquid to flow away from or be sucked out of the slide, test liquids can be perfused through the slide.

The other needle 36 can be employed to enable gases, such as carbon dioxide, oxygen or nitrogen, in any desired proportions to be led to the annular space between the two rings. In addition, by attaching to this needle a long and very narrow flexible tube it is possible to ensure that the inside pressure of the culture slide remains always the same as atmospheric pressure, without permitting any substantial loss of carbon dioxide or water vapor. This makes possible prolonged photographic recording of the cultured cells without loss of focus such as would result from vertical movements of the cover glass in response to changes of external or internal pressure.

Figure 7:
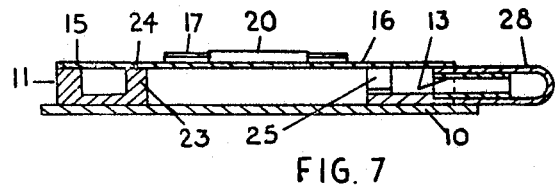
FIG. 7 is a view similar to FIG. 3 but showing a modification.

FIG. 7 shows a modification of the slide, wherein the inner and outer rings 11 and 23 respectively are formed integrally with one another, being provided by the wall-portions of an annular ring of U-shaped or channel-shaped radial cross section, as shown.

Figure 8:
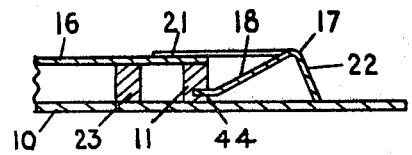
FIG. 8 is a fragmentary view similar to part of FIG. 2, but showing another modification.

FIG. 8 shows another modification wherein the anchoring posts for the spring 17 are omitted and slots 44 are provided at two diametrically opposite locations in the outer curved surface of the outer ring 11 for the springs 17 to engage therewith.

Other modifications are, of course, possible. For instances, in its simplest form, the slide may comprise only the outer barrier member 11, the inner barrier member being omitted. With such a slide normally a bubble of air will have to be left in the culture medium when the space defined by the barrier is filled, so that such a construction of slide does not have all the advantages of the illustrated preferred embodiment. Such a construction is intended, however, to be within the scope of the invention.

In the foregoing description, mention is made of the provision of a thin coating of viscous oil on the surface 15 of the ring 11 against which the cover glass 16 abuts. In practice, such coating of oil is sufficient to cause the cover glass 16 to adhere to and be sealed relative to the ring 11, and in fact removal of the cover glass in an intact unbroken condition, can only be effected if removal thereof is done with care, for example by gently lifting two adjacent corners of the cover glass 16 away from the glass plate 10 and applying steady but gentle separating force to the cover glass so that the seal is broken slowly. Thus, provided the slide is handled gently and with care, it is not absolutely necessary for clip means, such as the clips 17, to be provided for keeping the cover glass 16 in plate, although it will be appreciated that the provision of such clips enables the slides to be handled with less danger of accidental damage to, or displacement of, the cover glass.

It will be obvious, of course, that the shape of either or both of the barrier members can be other than described, for example they could be square or polygonal and that other forms of inlet can be provided. Other variations are, of course, possible.

What I claim is:

1. A cell culture slide for microscope use comprising a rectangular glass plate, a boundary annulus having an external diameter less than the width of said rectangular glass plate, said boundary annulus providing first and second opposed annular plane faces, and said boundary annulus also being provided with a closable radial tube passing through said boundary annulus and projecting therefrom, said first plane face of said boundary annulus being secured by an adhesive to said rectangular glass plate, an inner annulus providing first and second opposed annular plane faces, said inner annulus also being provided with a radial gap therethrough, said first plane face of said inner annulus being secured by an adhesive to said rectangular glass plate, and said second plane face of said inner annulus being coplanar with said second plane face of said boundary annulus, said inner annulus being located concentrically within said boundary annulus with said gap through said inner annulus in alignment with said closable radial tube through said boundary annulus, a removable cover glass sealingly contacting said second plane faces of both said boundary annulus and said inner annulus so as to define with said rectangular glass plate, said boundary annulus and said inner annulus spaces for cell culture medium and clip means locating and holding said cover glass in contact with said boundary annulus and said inner annulus.

2. A cell culture slide for microscope use comprising a glass plate, a boundary annulus having an external diameter less than the width of said glass plate, said boundary annulus providing first and second opposed annular plane faces and said boundary annulus also being provided with a closable radial inlet passage therethrough, said first plane face of said boundary annulus being secured to said glass plate, a removable cover glass sealingly contacting said second plane face of said boundary annulus so as to define, with said glass plate and said boundary annulus, a space for cell culture medium, an inner annulus providing first and second opposed annular plane faces, said inner annulus also being provided with a radial gap therethrough, said first plane face of said inner annulus being secured to the glass plate and said second plane face of said inner annulus being coplanar with said second plane face of said boundary annulus, said inner annulus also being located concentrically within said boundary annulus with said gap through said inner annulus in alignment with said radial inlet in said boundary annulus.

References Cited

UNITED STATES PATENTS

| 2,940,360 | 6/1960 | Carter. | |
| 2,942,520 | 6/1960 | Rose | 350—95 |
| 2,182,467 | 12/1939 | Brown et al. | 350—95 |
| 2,744,440 | 5/1956 | Robertson et al. | |
| 3,031,924 | 5/1962 | Lamal | 350—95 |
| 3,065,669 | 11/1962 | Orsi | 350—95 |
| 3,307,447 | 3/1967 | Carleton et al. | |

DAVID SCHONBERG, Primary Examiner

T. H. KUSMER, Assistant Examiner

U.S. Cl. X.R.

195—139